US008566894B2

(12) United States Patent
Lewis

(10) Patent No.: US 8,566,894 B2
(45) Date of Patent: Oct. 22, 2013

(54) METHOD AND SYSTEM FOR DISTRIBUTION OF MEDIA

(76) Inventor: Scott W. Lewis, Los Gatos, CA (US)

(*) Notice: Subject to any disclaimer, the term of this patent is extended or adjusted under 35 U.S.C. 154(b) by 1266 days.

(21) Appl. No.: 11/351,519

(22) Filed: Feb. 10, 2006

(65) Prior Publication Data

US 2007/0192450 A1    Aug. 16, 2007

(51) Int. Cl.
*H04N 7/173*    (2011.01)
(52) U.S. Cl.
USPC ............. 725/115; 725/89; 725/100; 725/131; 725/134; 725/142; 725/151
(58) Field of Classification Search
USPC .......... 725/115, 134, 105, 89, 100, 131, 142, 725/151
See application file for complete search history.

(56) References Cited

U.S. PATENT DOCUMENTS

| 5,122,917 | A | 6/1992 | Spainger |
| 5,212,677 | A | 5/1993 | Shimote et al. |
| 5,982,711 | A | 11/1999 | Knowles et al. |
| 6,055,315 | A | 4/2000 | Doyle et al. |
| 6,126,310 | A | 10/2000 | Osthoff et al. |
| 6,282,556 | B1 | 8/2001 | Chehrazi et al. |
| 6,366,914 | B1 | 4/2002 | Stern |
| 6,510,553 | B1 | 1/2003 | Hazra |
| 6,629,318 | B1 | 9/2003 | Radha et al. |
| 7,237,255 | B2 | 6/2007 | Fransdonk |
| 7,302,435 | B2 | 11/2007 | Kohut et al. |
| 7,370,016 | B1 * | 5/2008 | Hunter et al. ................... 705/57 |
| 7,421,726 | B1 | 9/2008 | Sorensen et al. |
| 7,486,926 | B2 * | 2/2009 | White et al. ................. 455/3.06 |
| 7,496,608 | B2 | 2/2009 | Wilbrink et al. |
| 7,533,399 | B2 | 5/2009 | Ma |
| 7,536,725 | B2 | 5/2009 | Raciborski |
| 7,568,143 | B2 | 7/2009 | Hamzy et al. |
| 2001/0029583 | A1 * | 10/2001 | Palatov et al. ................ 713/193 |
| 2002/0040475 | A1 | 4/2002 | Yap et al. |
| 2002/0056118 | A1 * | 5/2002 | Hunter et al. .................... 725/87 |
| 2002/0085648 | A1 | 7/2002 | Burns et al. |
| 2002/0088865 | A1 | 7/2002 | He et al. |
| 2002/0144277 | A1 | 10/2002 | Friedman et al. |
| 2003/0002848 | A1 | 1/2003 | Kawaoka et al. |
| 2003/0155417 | A1 | 8/2003 | Fairman |
| 2003/0161354 | A1 * | 8/2003 | Bader et al. ................... 370/537 |
| 2004/0034789 | A1 | 2/2004 | Horvat et al. |
| 2004/0148551 | A1 | 7/2004 | Kawahara |
| 2004/0261112 | A1 | 12/2004 | Hicks et al. |
| 2005/0177624 | A1 | 8/2005 | Oswald |

(Continued)

FOREIGN PATENT DOCUMENTS

WO    WO0152543 A1    7/2001

OTHER PUBLICATIONS

Office Action issued Sep. 8, 2011 in U.S. Appl. No. 11/351,408, filed Feb. 10, 2006.

(Continued)

*Primary Examiner* — Mulugeta Mengesha
(74) *Attorney, Agent, or Firm* — Sawyer Law Group, P.C.

(57) ABSTRACT

A system for the distribution of media is disclosed. The system comprises a network center; a delivery system for receiving data from and transmitting data to the network center; and a plurality of multimedia teller machines (MTMs) for receiving data from the delivery system, and for providing a plurality of gigablocks, wherein the gigablocks provide for secure and/or high bandwidth data.

11 Claims, 11 Drawing Sheets

(56) References Cited

U.S. PATENT DOCUMENTS

| | | |
|---|---|---|
| 2005/0177745 A1 | 8/2005 | Oswald |
| 2005/0177853 A1 | 8/2005 | Williams |
| 2005/0204019 A1 | 9/2005 | Flynn et al. |
| 2005/0211764 A1* | 9/2005 | Barcelou ............... 235/379 |
| 2005/0240958 A1 | 10/2005 | Nguyen et al. |
| 2005/0249277 A1 | 11/2005 | Ratakonda et al. |
| 2006/0075441 A1* | 4/2006 | Gauba et al. ............ 725/89 |
| 2006/0104370 A1 | 5/2006 | Yamanaka et al. |
| 2006/0127059 A1 | 6/2006 | Fanning |
| 2006/0268321 A1 | 11/2006 | Brack et al. |
| 2006/0282864 A1* | 12/2006 | Gupte ..................... 725/89 |
| 2007/0094701 A1 | 4/2007 | Kawase |
| 2007/0143793 A1* | 6/2007 | Barrett et al. ........... 725/44 |
| 2007/0177722 A1 | 8/2007 | Batcher |
| 2007/0192798 A1 | 8/2007 | Morgan |
| 2007/0226575 A1* | 9/2007 | Zhang et al. ............ 714/746 |
| 2008/0089671 A1 | 4/2008 | Lang et al. |
| 2008/0104454 A1 | 5/2008 | White |
| 2009/0006904 A1 | 1/2009 | Broadbent et al. |
| 2010/0067335 A1 | 3/2010 | Li et al. |
| 2010/0314405 A1 | 12/2010 | Alvarez |

OTHER PUBLICATIONS

"Help Center—Question and Answer," by Netflix. Retrieved from "http://web.archive.org." Available Dec. 4, 2003.

"Replacement Policy" by LucasArts. Retrieved from "http://web.archive.org." Available Mar. 18, 2005.

* cited by examiner

METHOD AND SYSTEM FOR DISTRIBUTION OF MEDIA

CROSS-REFERENCE TO RELATED APPLICATIONS

This application is related to the following co-pending applications:

application Ser. No. 11/351,408, entitled "A Method and System for Distribution of Media Including a Gigablock," filed on even date herewith.

Application Ser. No. 11/351,521, entitled "A System for Distribution of Media Utilized with a Receiver/Set Top Box," filed on even date herewith.

Application Ser. No. 11/351,512, entitled "A Method and System for Error Correction Utilized with a System for Distribution of Media," filed on even date herewith.

FIELD OF THE INVENTION

The present invention relates generally to media distribution and more specifically to a method and system for efficiently distributing media.

BACKGROUND OF THE INVENTION

Computer systems and users need to be provided with increasing amounts of data. There are many ways of trying to provide that data in an efficient fashion. One of these ways is to stream data to a particular user, via the internet. The streaming data environment, however, requires a very high bandwidth system to be efficient. Even with the systems that are presently available, a typical filmlike movie may take several hours to download, which is unacceptable in many situations.

There are other ways of delivering media. One way of delivering media, for example, is pay for view environments. However, in these kinds of environments, the user is limited to specific movies that are shown at specific times or the like. It is also possible to provide for the time shifting of the delivery of the media. An example of this process is Netflix, in which a user can ask for or can receive and send disks of information, or can apply for particular video rentals which arrive via the mail within some predetermined period of time, such as 1-3 days. This type of system, although it is clearly effective, depends on the existence of large warehouses of DVDs or the like and some kind of packaging and shipping system. In addition, it requires an extensive library or collection of data to allow for the user to have sufficient access to the information they want.

Accordingly, at this period of time no currently existing system allows for the delivery of media instantaneously to the consumer market, primarily due to bandwidth limitations. Additionally, in other methods of delivering media, such as Netflix, there are delays in receiving the media which are longer than may be desired. Accordingly, what is needed is a high speed system for delivering media utilizing existing technology that overcomes the above-identified issues. The present invention addresses such a need.

SUMMARY OF THE INVENTION

A system for the distribution of media is disclosed. The system comprises a network center; a delivery system for receiving data from and transmitting data to the network center; and a plurality of multimedia teller machines (MTMs) for receiving data from the delivery system, and for providing a plurality of gigablocks, wherein the gigablocks provide for secure and/or high bandwidth data.

DETAILED DESCRIPTION

The present invention relates to media distribution and more particularly to a method and system for efficiently distributing media. The following description is presented to enable one of ordinary skill in the art to make and use the invention and is provided in the context of a patent application and its requirements. Various modifications to the preferred embodiments and the generic principles and features described herein will be readily apparent to those skilled in the art. Thus, the present invention is not intended to be limited to the embodiments shown, but is to be accorded the widest scope consistent with the principles and features described herein.

Architecture

Figure 1:
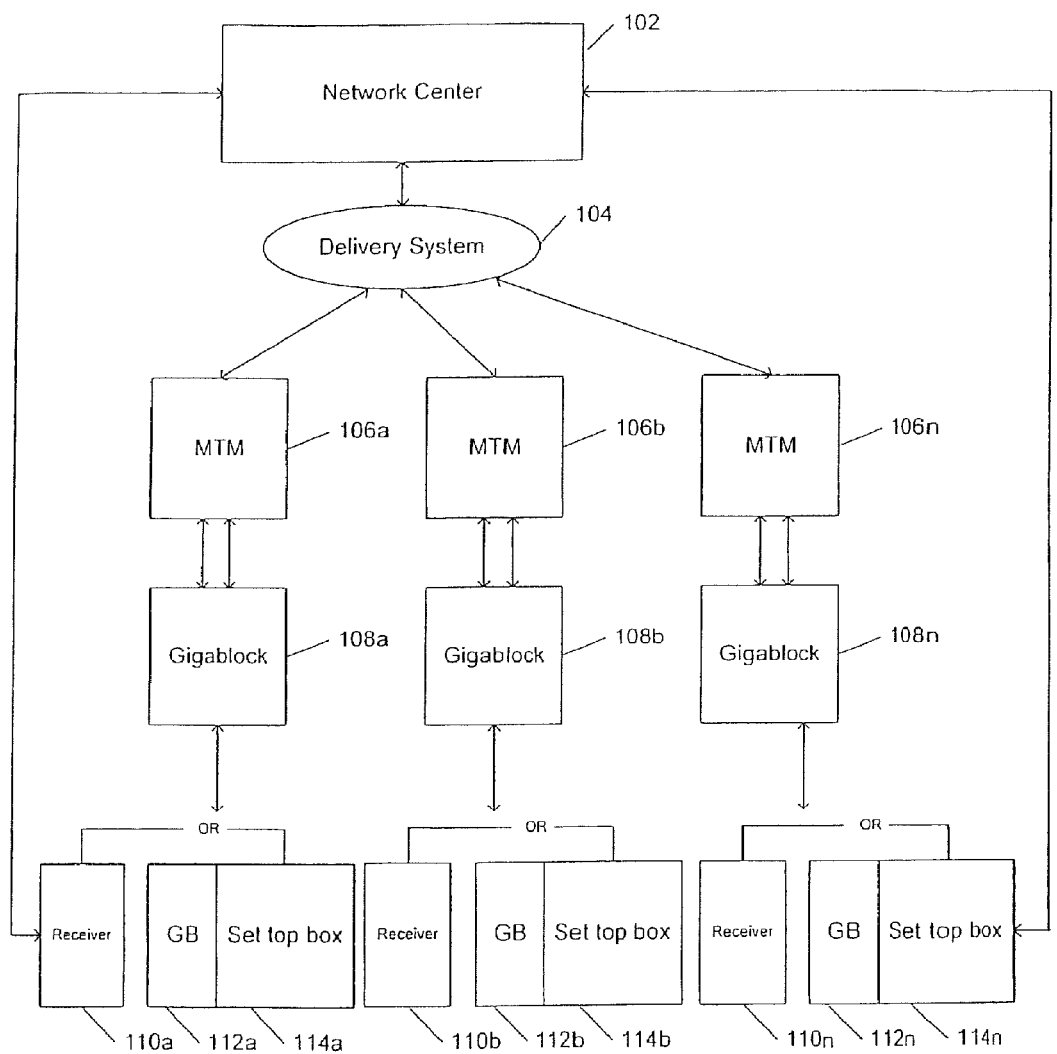
FIG. 1 shows an overview of the media system in accordance with the present invention.

The system and method according to the present invention comprises a high density media system that allows for transferring data in large blocks of information. FIG. 1 shows an overview of the media system 100 in accordance with the present invention. The media system 100 comprises a network center 102, a delivery system 103, media teller machines (MTMs) 106a-106n, which provide Gigablocks 108a-108n to receivers 110a-110n and/or set top boxes 112a-112c and 114a-114c.

Gigablock 108

The system and method in accordance with the present invention utilizes a concept referred to as the gigablock for providing large blocks of information. The gigablock is a self-contained subsystem which has one of three media types, either optical, fixed media (which could be a hard disk or multiple hard disks) or electronic (which is typically a Flash memory). The key to being self-contained is that the user can then have limited access to the medium.

Figure 2A:
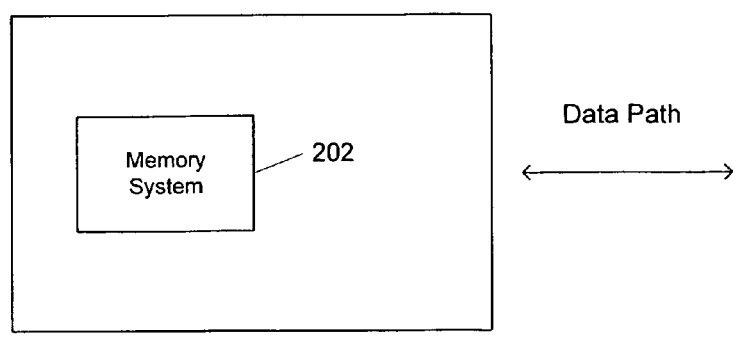
FIG. 2a shows one type of gigablock which has a memory system.
Figure 2B:
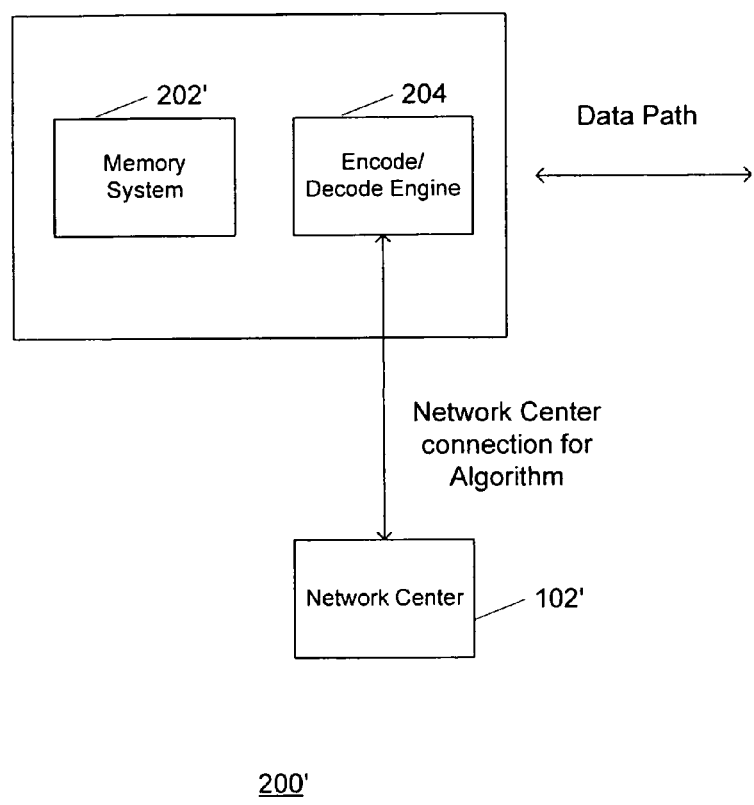
FIG. 2b shows a second type of gigablock which has a memory system and a decoding engine.

There are two types of gigablocks. FIG. 2a shows one type of gigablock 200 which has a memory system 202. FIG. 2b shows a second type of gigablock 200' which has a memory system 202' and a decoding engine 204 connected to a network center 102'.

The gigablocks shown in FIGS. 2a and 2b are obtained in one of two ways: either (1) by the user walking up to a teller machine and the gigablock is then dispensed to the user, or (2) the gigablock comes in the mail, in which case there is a media teller machine (MTM) at the postal facility which automatically generates the gigablock and puts it in an envelope, and then the package containing the gigablock goes into the distribution system at the postal center. Additionally, the gigablock can be (3) mailed like Netflix or (4) distributed directly via satellite, cable, internet wifi or cellular.

The MTM gets its information from the secured network. All of the links in the media center to the MTM are through either a private network or a virtual private network. The private network operates via satellite connectivity or hard wired connectivity to the MTM. In the virtual product network, it could be operated via the internet but it is operated in such a fashion that it is secure. Essentially, the connection is not made through the internet on a public network, as is the case at the present time with conventional media distribution. Additionally, the gigablock could be mailed like Neflix or distributed directly via satellite, cable, internet wifi or cellular.

The MTM produces the gigablocks. The gigablock could include a Flash memory or another type of media, or it could include a memory which includes the encoding and decoding engine. Additionally, the gigablock could be embedded in a VCR cartridge. In this embodiment, writing to the gigablock occurs in a manner similar to writing to the gigablock as described in previous embodiments. Reading/playing back from the VCR-gigablock occurs by writing data/generating analog signals to a magnetic head inside the VCR case, just as in the audio field line-in to audio cassettes are inserted into a car stereo receiver, to take a signal from an IPOD, for instance, to a car stereo receiver through the audio cassette reader.

When the user receives the gigablock, which is a physical unit or module, they take it home and then insert it into one of two boxes. The type of gigablock 200 which contains a memory 202 but not a decoding engine, shown in FIG. 2a, is inserted into a special gigablock set-top box, in which case the decoding engine is located in the set top box The type of gigablock 200' shown in FIG. 2b which already has the decoding engine 204 built in to it would be inserted, for example into a normal satellite receiver or VCR.

The gigablock 200 referred to in FIG. 2a is simply a memory system which has data path connectivity. The output from the gigablock 200' shown in FIG. 2b, which has the decoding engine 204 built into it, is a signal to an optical or analog video screen, in addition to having data connectivity or a data path.

Conventional approaches for MP3 file sharing, for example, utilize a standard base approach distributed through a non-secure network, the internet. Because the base is designed according to standard technology, the standard technology can be cracked and pirated. Secondly, conventional sharing of media files takes place through a non-secure network, which can also be cracked. The result is massive pirating of media information.

The system and method in accordance with the present invention utilizes a secure network, which makes it a non-exclusively internet-based distribution system. Secondly, media files are encoded in non-standard ways. Alternately, the gigablock could be distributed through a public network, satellite, cable, cellular, wifi, internet with or without a virtual private network since there is security based on the algorithm.

In order to ensure security, both ends of the system have to be controlled, i.e., the encoding of the files and the playback. The gigablock concept allows for this control.

In a CD implementation of the gigablock there may be for example four write arms. In the very high speed implementations there are DVD gigablocks which are written to via multiple write heads, typically from 4 to 64 to 1000, increasing the DVD/CD write speed by 4 × to 64 × to 1000 ×. In the lower speed implementation, write heads per write arms function such that entire sectors are written simultaneously/in parallel. In the highest speed implementation there is a "matrix" of heads, lasers or the equivalent, which "blast" a copy of the DVD/CD image onto the optical media which is then the optical gigablock.

Also in the case of N devices (real or virtual—particularly the case with flash-electronic memory) an entire movie might be loaded at the MTM into MTM memory—again flash or virtual/RAM—the movies can be copied into address locations on the gigablock—hence "N sector to GB" real or virtual.

Connectivity

Data path connectivity is approached via one of two models. Whether the gigablock is inserted into the set top box or into a receiver, both the set top box or receiver have a special connectivity link back to a network center. This connectivity could be a link via a telephone line. The telephone line does not need to be a high bandwidth telephone link. Other methods of connectivity between the set top box or receiver to the network center include satellite, internet, cable, cellular and wifi.

The connectivity link back to the network center is utilized for security and verification purposes. In conventional approaches today, the network is not secure, and files are typically encoded with known algorithms. Such encoded files are easily hacked or broken into. A system and method in accordance with the present invention offers the solution of removing both of these security risks.

Figure 3A:
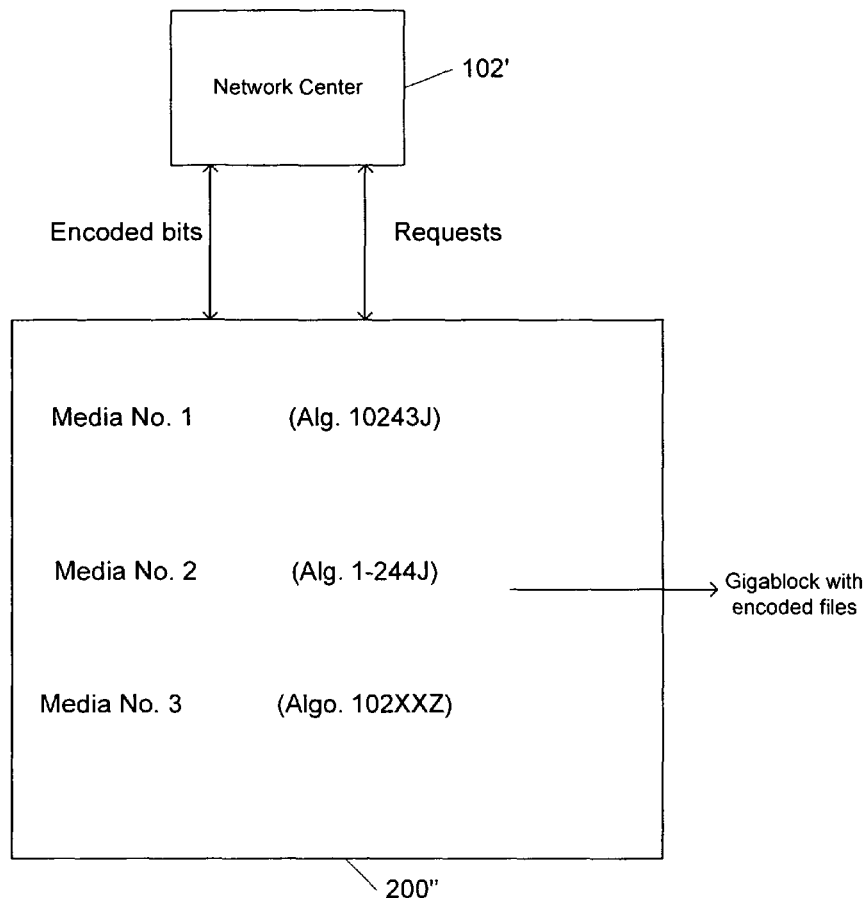
FIG. 3a shows the media encoding process utilizing algorithms.

In a preferred embodiment, first the network is secure. Second, the file is uniquely encoded. FIG. 3a shows the media encoding process utilizing algorithms. Every single version of piece of the media that goes on the gigablock 200" is uniquely encoded. A gigablock 200" can contain one or more of different kinds of media components: movies, songs, or software packages, for instance. Each of these media components has unique encoding. The media is coded at the MTM with one of an infinite number of algorithms. For example, Media 1 might use algorithm 1 of 10243J. Media 10, in another example, might use algorithm 10244J. In a third example, Media no. n might use algorithm 102XXZ.

Reference information on the encoding is stored at the network center 102'. The network center 102' is a massive data base which contains information on every media piece on every gigablock 200''', the ID of the algorithm that is used for the media piece, and also the ID of the user, as well as additional user registration information. This information is collected and maintained at the network center 102" via several different methodologies.

The network center 102" will also contain information relating the user and the media, called properties. For example, a piece of media, Star Wars, is sold to a customer. The customer can choose to pay for unlimited play, limited play, or another choice. Also, the choice of resolution (e.g., DVD or HD-DVD, can be specified). Other features will also be included in the network center information.

The network center 102" will also contain identification information, identifying users and the equipment owned and utilized by the user, such as a set top box. Having this information makes possible identification of piracy activities.

Alternately, the gigablock 200''' could be distributed through a public network, satellite, cable, cellular, wifi, internet with or without a virtual private network since there is security based on the algorithm.

Distribution Approach

Figure 3B:
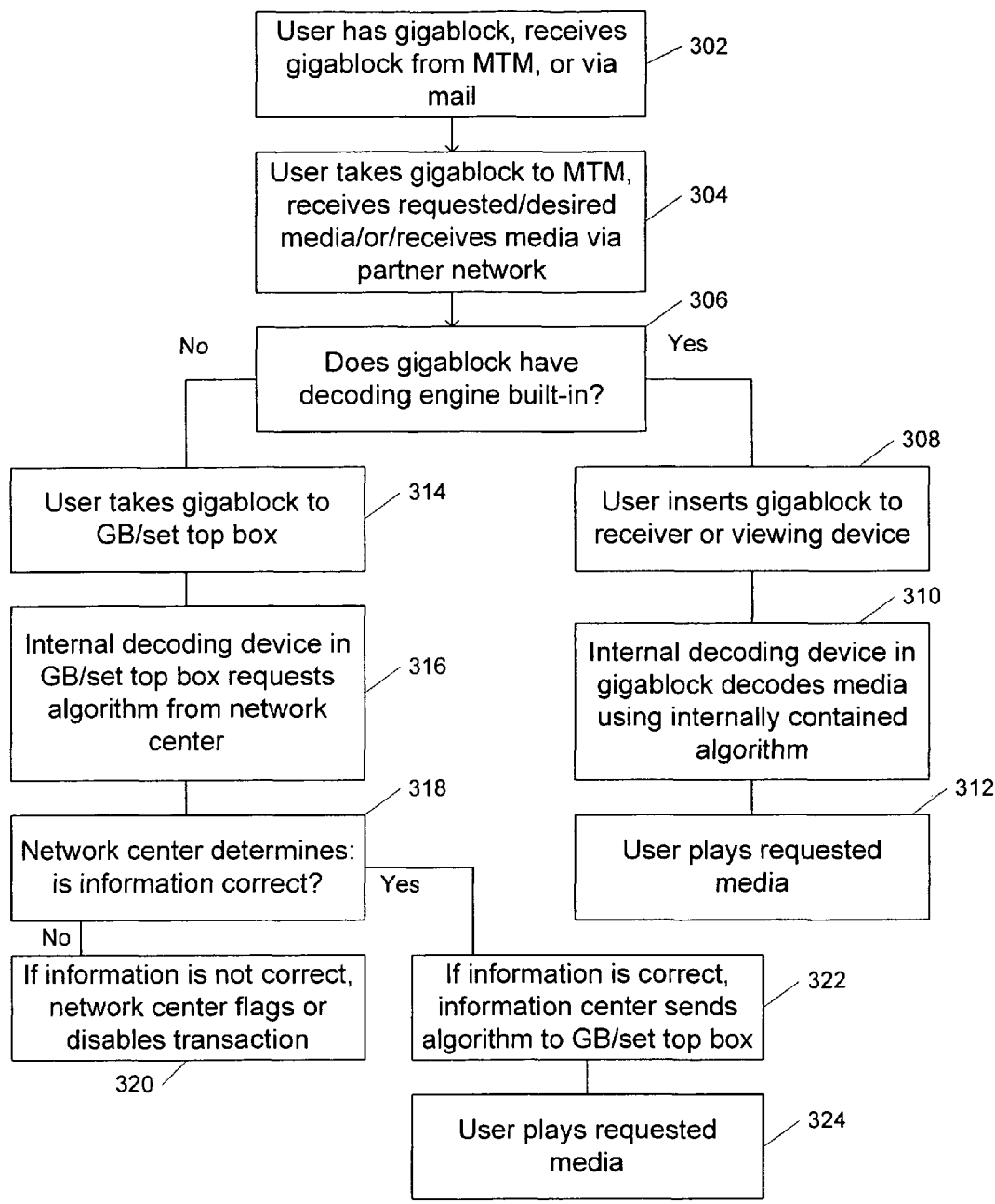
FIG. 3b shows the sequence for media distribution for a system and method in accordance with the present invention.

FIG. 3b shows the sequence for media distribution for a system and method in accordance with the present invention. First, the user has a gigablock, receives a gigablock from the MTM, or receives a gigablock via the mail, via step 302.

Second, the user takes the gigablock to the MTM, and receives the requested/desired media, or it is also possible that a gigablock can be received via a partner's network, via step 304. Utilizing a partner's network means that it is possible that another secure network might contract to distribute media via a gigablock.

Next, it is determined if the gigablock has a decoding engine built-in, via step 306. If the gigablock has a built-in decoding engine, the user inserts the gigablock in a receiver or viewing device, via step 308. The internal decoding device in the gigablock then decodes the media using the internally contained algorithm, via step 310. The user then plays the requested media, via step 312.

If the gigablock does not have a built-in decoding engine, the user takes the gigablock to a set top box, via step 314. The internal decoding device located within the set top box then requests the appropriate algorithm from the network center, sending the media ID number to the network center via step 316. This may be done via a regular telephone line. The network center then looks up the user ID number and determines whether the user is the correct user, and also verifies payment information, etc., via step 318. If the information is not correct, the network center may flag or disable the transaction, via step 320. If the information is correct, the network center sends the algorithm to the set top box, via step 322. The user is then able to play the desired media, via step 324.

The chip within the set top box or gigablock has an infinite algorithm decode capability. The ability to drive the decoding process through a limited set of information which is downloaded has been put into this decoding engine. Therefore the decoding engine kernel can be downloaded very quickly, in approximately 2 seconds. [047] Returning to the gigablock, the next problem to be addressed is vandalism. 10 to 30 gigabytes of material have to be delivered in approximately 10 to 30 seconds. There are no existing low-cost networks that support that bandwidth transfer. Therefore, this media transfer is accomplished via the "media" architecture.

Media Architecture

The media architecture makes possible secure delivery of large media files between the network center to the MTM, and from the MTM to the gigablock.

The bandwidth problem is solved in two ways. First, an encoded media library is established on the MTMs. In other words, as much as possible of current releases, top sellers, etc., 20 percent of the content demanded by 80 percent of the public, is placed onto an encoded media library on the MTM. The encoded media library is coupled with on-demand encoded media transfer.

Essentially, the MTM comprises an encoded media library and on-demand encoded media transfer, i.e., media encoding and transfer in sections.

There are two different resulting customer service time frames. Customer requests which are included in the encoded media library on the MTM can be responded to very quickly. Advance orders can be met, as the media information is transferred to the MTM, in a longer, but still short, amount of time.

In addition to going to the MTM for delivery services, the customer can also go to the internet for browsing and ordering. Then, for advance media unit ordering, the customer can either go to the MTM after placing the order, or request mail order. Mail order would be accomplished by having an MTM within the operations of the post office with potential same-day delivery and at most next day delivery at reduced cost of delivery.

The next problem which the method and system in accordance with the present invention solves is how to transfer the media information from the MTM to the gigablock. Conventional transfer facilities today can not transfer 10 GB a second, for example. Until such transfers are cost-effective, the present invention uses distributed media architecture to transfer media between the MTM and the gigablock.

Distributed media architecture

Figure 4:
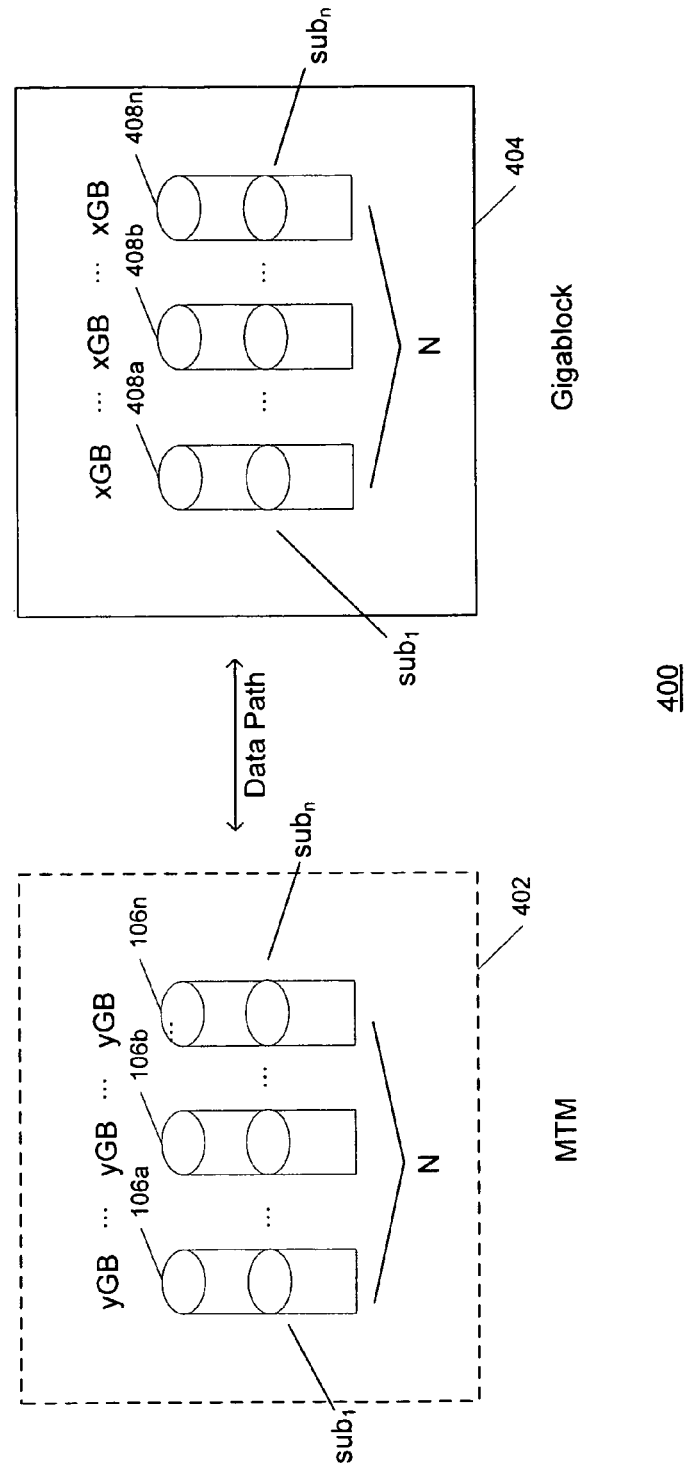
FIG. 4 illustrates a distributed media architecture in accordance with the present invention.

FIG. 4 illustrates a distributed media architecture 400 in accordance with the present invention. There are n number of disks 106a-106n inside the MTM 402. Each disk 106a-106n typically could store 100GB of material; the amount which can be stored will increase in the future. Each one of these memory units (disks) 106a-106n has a fraction of media pieces $sub_1$-$sub_n$ on it.

Using Star Wars as an example of a media piece, the film, which is approximately 10GB, is divided into n components. All these components are placed $sub_1$, $sub_2$ to $sub_n$ components in one MTM 402. When the media piece is transferred from the MTM 402 to the gigablock 404, the gigablock 404 has a parallel architecture, so inside the gigablock 404 there is a series of n gigabyte storage units $sub_1$-$sub_n$, for example, four Flash units. Current Flash capabilities are 2 gigabytes, and this is growing. Using the Star Wars file as an example, if this file is a 10 gigabyte file, and it is separated into 10, then there is 1 gigabyte for a segment, and in that gigablock 404 again, there exist, in this case, 10 segments. A gigablock of this capacity could store 10 movies. However, the media piece is being written in segments, and will write to specific segments. The subsegment will write to a specific segment, $sub_1$ to $sub_{10}$ in this case. Using this method of data transfer, limitations of speed can be overcome.

Data transfers can be implemented via electrical connectivity, optical connectivity, physical/magnetic connectivity, and wireless connectivity. In the case of wireless connectivity, either parallel high speed (10 Mbits/second-100 Mbytes/second) wireless connections can be made, or alternatively, one ultra high speed (100 Mbits/second-100 Gbytes/second) wireless connection, taking advantage of the fact that only small distances need to be traversed allowing ultra-high frequency non-interfering signals to be used.

Each unit has to have the same number of memory units, not in a physical sense but in a virtual sense. There will be different models of the gigablocks, with differing memory capacities.

The above describes the data path. The first part of the process is transferring data from the network to an MTM; the second part of the process is transferring data from an MTM to the gigablock; and the third part of the process is transferring data from the gigablock to the set top box.

Utilizing parallel distributed media architecture, inside the set top box there are also an equal number of memory storage units that will write to a single, depending on the version, gigablock.

Figure 5A:
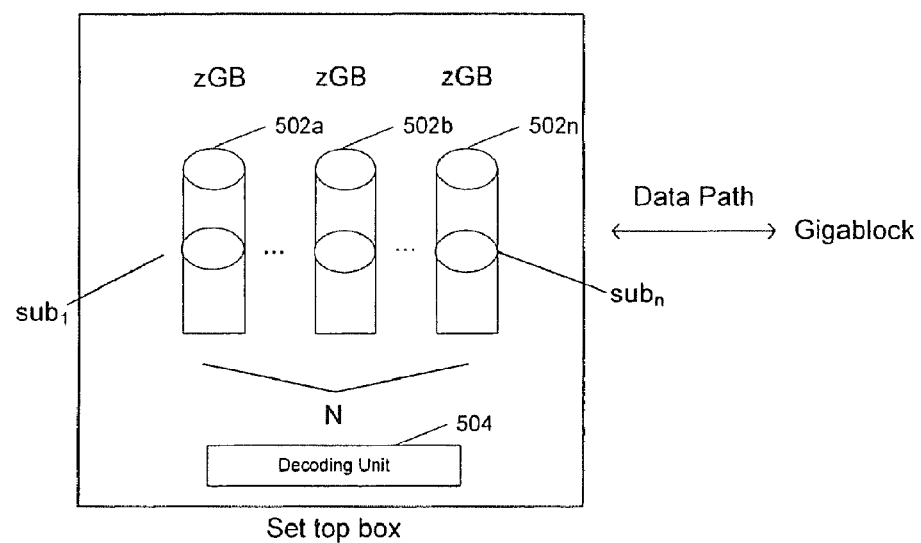
FIG. 5a shows a decoding unit located in the set top box.

FIG. 5a shows a decoding unit 504 located in the set top box 500, an approach which allows for greater flexibility.

Figure 5B:
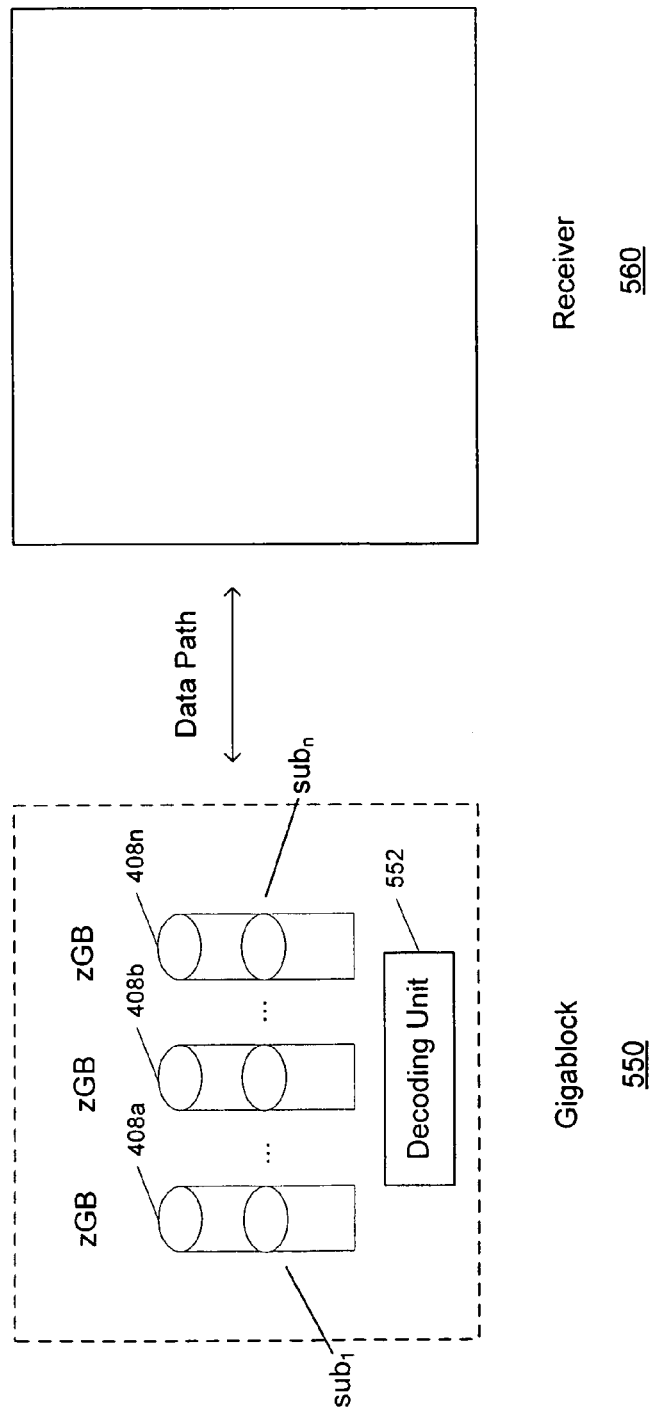
FIG. 5b shows the gigablock with the decoding unit within the gigablock.

FIG. 5b shows the gigablock 550 with the decoding unit 552 within the gigablock 550, and the associated receiver 560, an approach which allows for lower cost, because all that is required is an input. In the first approach, parallel architecture does not have to be utilized; in the second approach, parallel architecture is required.

Security

An encoded file methodology provides for security. Essentially, the processes described in the present invention serve to resolve security problems. These processes involve (a) the gigablock, (b) the set top box, or (c) the gigablock with the decode engine getting the decode algorithm from the network center in exchange for the ID information, which is stored in the network center.

Additional embodiments include making use of the already existing features for security purposes, such as detecting flagging, duplicate use, etc.

In another embodiment, security can be enhanced through user identification technology. In one approach, a user can be identified through a type of number, which is essentially a membership number or the equivalent; a driver's license; or a social security number. In a second approach, the user can be identified through the use of a smart card or credit card equivalent. In a third approach, a user can be identified via fingerprint identification (biometrics). By implementing user identification control in the security methodology the method and system in accordance with the present invention is transformed from a Class A to a Class AAA security system.

User ID Methodology

Figure 6:
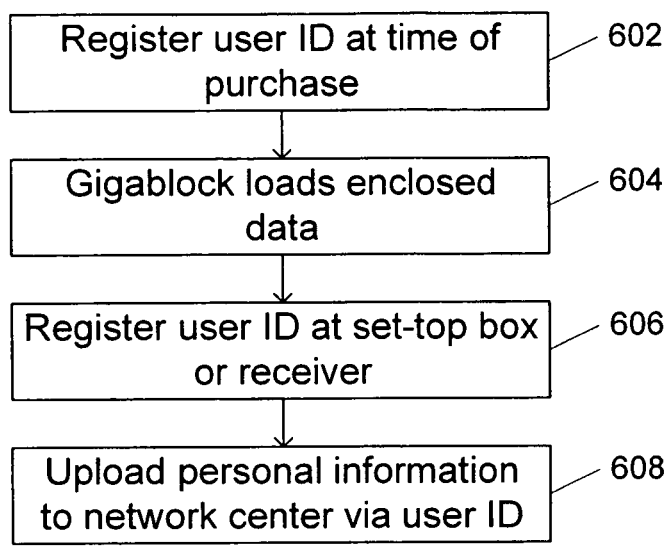
FIG. 6 shows how ID methodology is used as part of the security process.

FIG. 6 shows how ID methodology is used as part of the security process. First, at the time of the MTM/gigablock purchase and dispensing of media material, the user ID is registered and confirmed, via step 602.

The single gigablock now will contain the above intelligence. With a biometric sensor, either the user could be registered by pressing a thumb against the side of the gigablock or MTM, a smart card could be applied, or a credit card and smart card could be slid into the MTM, and the MTM would then contain information on which specific user is using a specific gigablock for a specific use.

The gigablock can now load up its encoded software via step 604, which is every piece of media. When the user arrives at home and puts the gigablock into their set top box or receiver, the personal user identification is again registered, via step 606. As a result, concentric usage sales/pricing methodologies can be established with the resulting collected data. Such user information usage data can help in reducing piracy of media materials, and can also be utilized in, demographic studies. When the user connects to their set top box, all of this personal information will then be uploaded to the network center, via step 608. The network center will then have information on what is happening with the gigablock and encoded media material at any moment.

Demographic System and Method

The result is a system and method for collecting user demographic information, describing real-time usage down to the unique demographic level. With such demographic information, data can be created to associate age, wealth, and individual users with song type or type of media sales. Such information could then be used to optimize MTM, GB, or set-top box libraries or direct customized media or advertising insertions. Data can also include permissions for the user to specific resolutions and devices such as set top, iPod and the like. Advertising insertions could also be downloaded from the network center tailored to a particular user. These advertising insertions can be recalled as needed. Accordingly, the media is preloaded with the advertising insertion, reducing the net data required for a given program or set of programs. The media can then be played back with the advertising being entered at the appropriate points in the media.

Error correction

It is well known that over time, DVDs after reuse can develop mechanical defects, such as erosion in media tracks. Such defects manifest themselves as either skips or can make the media unplayable, making the medium useless or inappropriate for use by a consumer. Defects and errors such as these can be corrected by analysis of the errors. The correction for the errors can then be sent to the user via communication links. Accordingly, a software algorithm or the like can be provided that analyzes the errors and corrects for such errors. Conventionally, it has not been feasible to provide any kind of error correction methodology, especially because of three reasons:

1. There has been no means for feedback through any kind of network center that could provide a fix for the problem;

2. Analysis was not possible at the local level to determine the nature of the problem; and 3. There was no system in place to provide for complete replacement of, for example, a unit. With the gigablock and with other forms of instrumentation, which actually include an advanced form of DVD feedback or a CD player with feedback, it now becomes possible to provide for this capability to repair defects and errors in the playback media.

Referring back to FIGS. 5a and 5b, the set top box or receiver will also contain analysis circuitry software connected to a network and to the network center. The software could include a corruption of one part of the software, which can occur because of viruses. Either within the gigablock, set top box or enhanced plays, there is the capability to perform local analysis and identification of errors and defects, down to a variety of levels, the bit level, the track level, the segment level, or to another level, for example.

Figure 7:
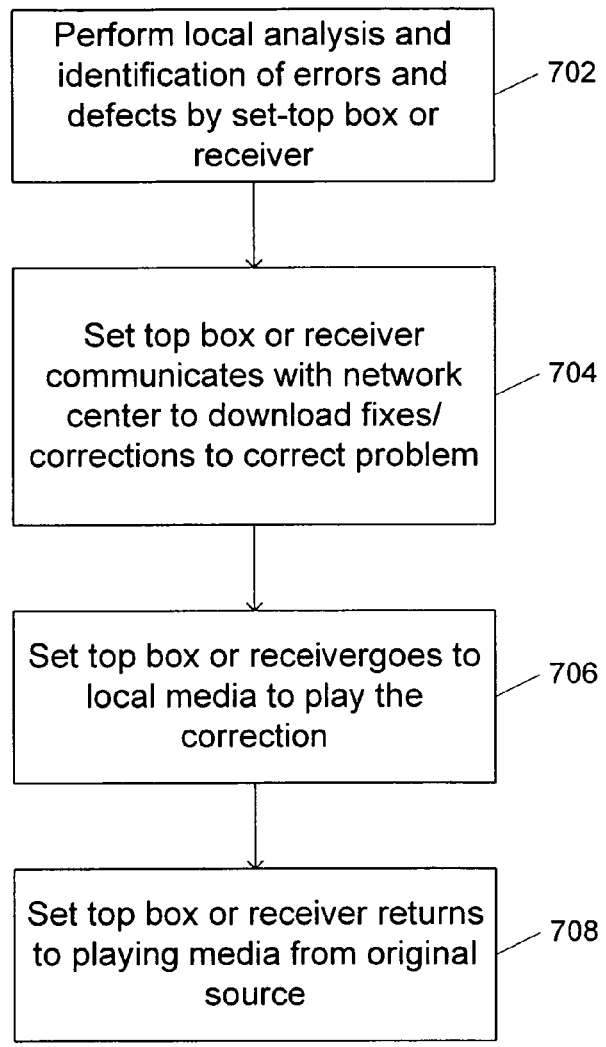
FIG. 7 shows an error correction method in accordance with the present invention.

FIG. 7 shows an error correction method in accordance with the present invention. First, local analysis and identification of errors and defects is performed in the set top box or receiver, via step 702. Next, the set top box, receiver or enhanced player communicates with the network center to download the fixes/corrections for correcting the problem, via step 704. When the set top box, receiver, gigablock or enhanced player plays the media, and runs into the error section, it will stop playing from the damaged media and will go to the local media which is inside the enhanced player or gigablock, via step 706. The local media includes correction capabilities and fixes, and will move that material to the portions of damaged media, and then go back and continue with the playing of the gigablock, set top box, receiver, or CD/DVD enhanced player, via step 708.

Figure 8:
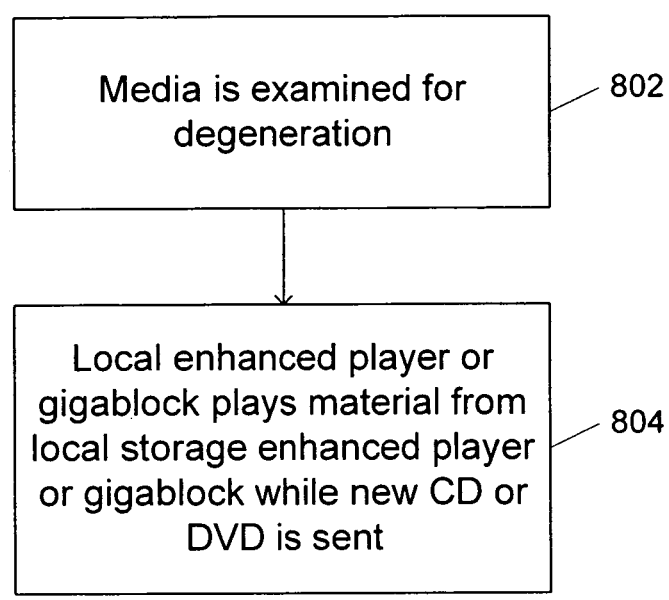
FIG. 8 is a flow chart showing a process for locating and reporting media degeneration in accordance with the present invention.

Additionally, this technology, since it involves reporting problems and errors, makes it possible, to determine if and when a piece of media which the customer buys is progressively degenerating. FIG. 8 is a flow chart showing a process for locating and reporting media degeneration in accordance with the present invention. With this tracking and repair capability, it would be possible for a vendor who wants to sell a CD or DVD, to sell that CD or DVD with a guaranteed quality level for life. First, media is examined for degeneration, via step 802. The local enhanced player or gigablock could then play the material from the local storage enhanced player or gigablock, while the vendor could send a new CD or DVD via the mail or in other ways, as, for example, through gigablock encoding, via step 804.

Tracking of the media for errors and defects would be performed in combination with the analysis section of an enhanced player, or within the decoding boxes within the set top box or gigablock, utilizing communications between the analysis unit and the network center. The network center would have the capability to track reports from the analysis section of the enhanced player.

If the full capabilities of the demographics capability of the gigablock are utilized, the media piece can be identified down to the individual customer level. This makes it possible for the vendor to sell a product with a guaranteed quality level to an individual customer for a particular price.

If there are transmission or time delay issues, the network center, instead of sending a 100 percent identical resolution version of the media set, could instead send a reduced resolution media set as a temporary repair for the media. This could be accomplished in at least two ways. A user might play a DVD for the first time and the analysis section would detect any problems. In one approach, the analysis unit would then analyze the entire disk, report errors or defects to the network center, and then receive corrections/fixes and store them in local storage. In a second approach, the analysis section can operate in parallel with the playing of the media, reporting defects or errors shortly before the DVD being played reaches the location of the error, then requesting corrections from the network center, receiving those corrections and substituting the corrected media portions for those on the DVD or CD at the appropriate time, which would be less costly than the first approach.

In the second approach, while the DVD is playing the first section/chapter of the DVD, the analysis section is examining the next section/chapter. If it identifies a problem with chapter 2, it requests a fix/correction. By the time the DVD is playing section/chapter 2, the fix/correction has arrived from the network center and the movie being viewed, for example, will continue to play properly.

Returning to the problem of reduced resolution (of material played from the local unit), it may be that the user doesn't want the playback to be interrupted, in other words, for the DVD to skip over an error section. In this instance, media information to replace the error section can be transmitted at lower resolution, which allows the viewer to continue viewing the DVD without interruption. Then, either simultaneously or subsequently the high resolution replacement data can be sent from the network center to be utilized for future playback sessions, or a full resolution file will be stored on the local unit for future playback sessions, or a full resolution file would be either shipped to you, downloaded to you, or otherwise delivered.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A system for the distribution of media comprising:
   a secure network center;
   a delivery system coupled to the secure network center;
   a plurality of multimedia teller machines (MTMs) coupled to the delivery system, wherein each of the plurality of MTMs receive a plurality of media files from the secure network center through the delivery system and each of the plurality of MTMs uniquely encodes the plurality of media files, wherein reference information for each of the plurality of uniquely encoded media files is stored with the secure network center, wherein the reference information includes an algorithm ID associated with the unique encoding, wherein usage information relating users to at least one of the plurality of uniquely encoded media files is stored with the secure network center to identify piracy activities, wherein the usage information includes play time period, resolution selection, and tracking details, wherein each of the plurality of MTMs produce a plurality of gigablocks, wherein each of the plurality of gigablocks includes a memory system for storing at least one of the plurality of uniquely encoded media files; and
   a plurality of receivers that each include a decoding engine and that are each designed to receive the plurality of gigablocks, wherein responsive to receiving the plurality of gigablocks, each of the plurality of receivers directly connects to the secure network center to verify the reference information using the decoding engine and to allow playing of the at least one of the plurality of uniquely encoded media files.

2. The system of claim 1, wherein the plurality of receivers comprise a plurality of set top boxes.

3. The system of claim 1, wherein the plurality of receivers allow for error correction of the plurality of media files based upon information from the secure network center.

4. The system of claim 1, further comprising:
   a detection unit for improper usage of the plurality of media files, wherein the detection unit utilizes user media information stored in the secure network center to authorize proper usage of the plurality of media files.

5. The system of claim 4, wherein the user media information includes a user ID to authorize proper usage of one of the plurality of media files.

6. The system of claim 5, wherein the user ID can be any of or any combination of a membership number, driver's license, social security number, biometric information, credit card and smart card.

7. The system of claim 1, wherein the MTMs include an encoded media library and an on-demand encoded media transfer system.

8. The system of claim 7, wherein the encoded media library includes current release media files and top selling media files.

9. The system of claim 1, wherein the at least one of the plurality of uniquely encoded media files stored on one of the plurality of gigablocks is received via any of cable, telecommunications, Wi-Fi and the Internet.

10. The system of claim 1, wherein demographic information from the secure network center is utilized to optimize the plurality of gigablocks.

11. The system of claim 1, wherein the secure network center provides advertising insertions to the plurality of gigablocks.

* * * * *